US010192374B2

(12) United States Patent
Sass et al.

(10) Patent No.: US 10,192,374 B2
(45) Date of Patent: Jan. 29, 2019

(54) RECEIVING CIRCUIT FOR A VEHICLE REMOTE

(71) Applicant: Continental Automotive GmbH, Hannover (DE)

(72) Inventors: Dieter Sass, Regensburg (DE); Herbert Froitzheim, Pettendorf (DE); Norbert van der Heyd, Bad Abbach (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/075,427

(22) Filed: Mar. 21, 2016

(65) Prior Publication Data

US 2016/0275736 A1 Sep. 22, 2016

(30) Foreign Application Priority Data

Mar. 19, 2015 (DE) ........................ 10 2015 205 038

(51) Int. Cl.
*G07C 9/00* (2006.01)
*H04B 1/00* (2006.01)
*B60R 25/24* (2013.01)

(52) U.S. Cl.
CPC ..... *G07C 9/00126* (2013.01); *G07C 9/00182* (2013.01); *H04B 1/0064* (2013.01); *B60R 25/24* (2013.01); *G07C 9/00944* (2013.01)

(58) Field of Classification Search
CPC ...... G07C 9/00126; H04B 1/16; B60R 25/04; B60R 25/209; B60R 25/24
See application file for complete search history.

(56) References Cited

U.S. PATENT DOCUMENTS

| 4,500,802 | A | 2/1985 | Janutka ........................ 327/432 |
| 5,905,444 | A | 5/1999 | Zimmer ....................... 340/5.61 |
| 7,683,757 | B2 | 3/2010 | King et al. .................... 340/5.72 |
| 8,587,403 | B2 | 11/2013 | Ghabra et al. ............... 340/5.61 |
| 2003/0222756 | A1* | 12/2003 | Shimonomoto ...... B60R 25/246 340/5.61 |
| 2005/0012393 | A1* | 1/2005 | Elliott ...................... H04B 5/02 307/10.2 |
| 2005/0162140 | A1 | 7/2005 | Hirst ........................... 323/273 |

(Continued)

FOREIGN PATENT DOCUMENTS

| DE | 19541855 C1 | 2/1997 | ............ B60R 25/20 |
| DE | 102006022853 A1 | 2/2007 | ........... B60R 16/023 |

(Continued)

OTHER PUBLICATIONS

German Office Action, Application No. 102015205038.6, 12 pages, dated Oct. 8, 2015.

(Continued)

*Primary Examiner* — Nabil H Syed
(74) *Attorney, Agent, or Firm* — Slayden Grubert Beard PLLC

(57) ABSTRACT

The present disclosure teaches a receiving circuit for use with a vehicle and serving for receiving a signal of a transponder. The receiving circuit may include a plurality of input paths each having an antenna and a multiplexer with a plurality of switches controlled by control signals and connecting at least one of the input paths to at least one further device in the form of a discharger and/or detuner and/or amplifier.

15 Claims, 3 Drawing Sheets

(56) References Cited

U.S. PATENT DOCUMENTS

| | | | |
|---|---|---|---|
| 2006/0125601 A1* | 6/2006 | Onishi | H04B 7/0805 |
| | | | 340/5.72 |
| 2006/0164210 A1 | 7/2006 | Ikeo | 340/5.72 |
| 2007/0026898 A1 | 2/2007 | Nantz et al. | 455/562.1 |
| 2007/0142088 A1* | 6/2007 | Boh | B60R 25/00 |
| | | | 455/562.1 |
| 2010/0001768 A1 | 1/2010 | Bezooijen et al. | 327/108 |
| 2010/0195550 A1 | 8/2010 | Nakano et al. | 370/311 |
| 2010/0245039 A1 | 9/2010 | Tokunaga | 340/5.61 |

FOREIGN PATENT DOCUMENTS

| | | | |
|---|---|---|---|
| DE | 102006043141 A1 | 5/2007 | H04Q 9/00 |
| DE | 102010016066 A1 | 11/2010 | G08C 17/02 |
| DE | 102010028039 A1 | 12/2010 | B60R 25/00 |
| DE | 102013220596 A1 | 4/2015 | G01R 19/00 |
| DE | 102014222603 B3 | 12/2015 | B60R 25/00 |

OTHER PUBLICATIONS

U.S. Non-Final Office Action, U.S. Appl. No. 15/075,513, 16 pages, dated Jan. 12, 2017.
U.S. Notice of Allowance, U.S. Appl. No. 15/075,513, 12 pages, dated Aug. 1, 2017.
U.S. Notice of Allowance, U.S. Appl. No. 15/612,551, 12 pages, dated Oct. 26, 2017.
U.S. Non-Final Office Action, U.S. Appl. No. 15/612,551, 15 pages, dated Jul. 12, 2017.

* cited by examiner

RECEIVING CIRCUIT FOR A VEHICLE REMOTE

CROSS-REFERENCE TO RELATED APPLICATIONS

This application claims priority to DE Application No. 10 2015 205 038.6 filed Mar. 19, 2015, the contents of which are hereby incorporated by reference in their entirety.

TECHNICAL FIELD

The present disclosure relates to a receiving circuit and to a receiving device comprising a receiving circuit in general and, in particular discloses a vehicle access and start system without active use of the vehicle key such as, for example, a Passive Start Entry (PASE) system.

BACKGROUND

Access systems may aim to efficiently and cost-effectively generate and communicate a low-frequency magnetic field with a large range. At the same time, they must comply with the radio approval regulations and the EMC guidelines of the automobile manufacturers.

A response of an immobilizer transponder is received, e.g., with a very small coupling factor to the antennas which beforehand emitted a comparatively high (strong) carrier signal (with modulated data) and thus supplied the transponder (TRANS) with energy. The transponder in this case is, e.g., of the "Charge and Talk" type, that is to say that it is firstly charged with energy from a low-frequency magnetic field, acquires data from this field (by demodulation), calculates a response and sends the response back using the stored energy.

Keyless vehicle access and start systems, such as the passive start entry (PASE) system, for example, may be automatic systems which unlock a vehicle without active use of an automobile key and start it just by actuation of the start button. This is made possible by an electronic key carried by the driver of the vehicle. The vehicle periodically emits, via at least one antenna situated on the vehicle, an enquiry signal at an LF frequency (LF stands for "Low Frequency" with frequencies between 20 kHz and 200 kHz, for example), said signal being coded by means of a first coding table. The system thereupon goes into a receiving mode in the UHF range (UHF stands for ""Ultra High Frequency" with frequencies in the three-digit MHz range, for example) and waits for confirmation. If a key is in range, it receives the LF signal, decodes it and re-emits it as a UHF signal with a new coding using a second coding table. The UHF signal is decoded in the vehicle. Since the vehicle knows both coding tables, it can compare its own original emission with the signal just received and grant access in the case of correspondence. If there is no correct response within a defined time, nothing happens and the system switches to standby again. The engine starting process, in some examples, substantially corresponds to that of access control, except that here an engine start button would be actuated.

There are fault situations in which the engine starting process does not proceed functionally, e.g., in the case of interference with the UHF signal or in the case of an absent or discharged battery in the key. The engine start can then be enabled by means of the immobilizer function contained in the PASE system. On the part of the vehicle, an enquiry signal at an LF frequency, said signal being coded by means of a first coding table, is emitted via at least one antenna situated on the vehicle. The system thereupon goes into a receiving mode for receiving the response of the key in the LF frequency range. The key contains a transponder (TRANS) operated without a battery because it obtains its energy for supply from the low-frequency magnetic field and stores it, and said transponder, in the case of the "Charge and Talk" type, sends its response back by means of the low-frequency magnetic field using the stored energy, that is to say dispenses with the use of the UHF transmission.

In this case, an inductive antenna is predominantly used as an antenna for emitting the LF signal, said inductive antenna being embodied for example as a ferrite core provided with a winding (also known as magnetic antenna or ferrite antenna). In this case, the inductance of the inductive antenna is often operated together with a capacitor in a resonant circuit. The energy consumption of such a resonant circuit is usually kept low by a quality factor that is as high as possible and by an exact frequency tuning, in order to minimize the total current consumption of the access and start system. A low current consumption is also desirable, for example, because otherwise the vehicle battery would be rapidly discharged in the event of the vehicle being parked for a relatively long time. However, a high quality factor restricts the transmission data rate and an exact tuning in conjunction with a high quality factor requires some complexity. Therefore, conventional arrangements often constitute an unsatisfactory compromise between data rate, complexity and energy consumption.

Therefore, quasi-resonant resonant circuit drivers are known, with which a high quality factor (and thus a low current consumption) can be achieved in conjunction with a sufficiently high data rate. These driver circuits may have the disadvantage that not necessarily generally all of them comply with the radio approval regulations. The radio approval regulations are intended to ensure that other radio services (e.g., broadcasting (radio and television), mobile radio services (police and security services) or cellular phones) are not adversely affected in their operation. A further disadvantage of such quasi-resonant driver circuits may include failure to comply with the guidelines of the automobile manufacturers with regard to electromagnetic compatibility (EMC).

Furthermore, quasi-resonant resonant circuit drivers are known, which are improved to the effect that not only do they enable a low current consumption and low interference signal emission in conjunction with low circuitry and adjustment complexity, but they additionally also enable compliance with radio approval regulations.

DE 10 2013 220 596 on Oct. 11, 2013 relates to a quasi-resonant resonant circuit driver. DE 10 2014 222 603 on Nov. 5, 2014 relates to suppression of common-mode emission by a circuit arrangement. DE 10 2014 220 406 on Oct. 8, 2014 describes a quasi-resonant resonant circuit driver, wherein FIG. 13 thereof shows a driver channel with source terminals of transistors that are connected to one another back-to-back. DE19541855A1 relates to a method for reducing the reception quality factor and the resonant frequency of the antenna resonant circuit.

SUMMARY OF THE INVENTION

However, as yet there is no known method by which the self-generated response of a Charge&Talk transponder can be received efficiently and cost-effectively on a plurality of antennas that would each be operated in a parallel resonant circuit. In conventional resonant circuit drivers, a detuning of the resonant frequency of the antenna resonant circuit relative to the carrier frequency of the Charge&Talk transponder can pose the problem that the signal emitted by the transponder is received only with reduced sharpness of resonance and with a superposed differential frequency.

In the case of very small coupling factors, the amplitude of the carrier signal should be increased in order that the transponder can be supplied with energy via the field. A voltage divider having a high division factor would be necessary in order to be able to feed the oscillation voltage to the demodulator. Said voltage divider can also reduce the modulation swing. With limited reception sensitivity of the demodulator, a specific coupling factor is thus necessary in order that the range (distance between resonant circuit antenna and transponder coil) is limited.

The teachings of the present disclosure may serve to optimize a receiving circuit and a transmitting device comprising a receiving circuit in particular for a keyless vehicle access and/or start system such as, for example, a PAssive Start Entry (PASE) system, and a method.

Some embodiments of the present teaching can allow an advantageous, efficient and cost-effective use of a (transmitting and) receiving system comprising a plurality of (LF) antennas (e.g., at doors of a motor vehicle having a PASE system).

Some embodiments may include bidirectional communication between an antenna driver with an immobilizer receiver and multiplexer and a key with a transponder can be used efficiently for (mutual) acquainting (="training") of the transponder and the motor vehicle. In vehicle manufacture, any (PASE) antenna of a motor vehicle including an embodiment of a (transmitting and) receiving system can be used for this purpose, including one of the exterior antennas (easily accessible compared with an antenna at an engine controller), e.g., at doors for persons or at the trunk.

In embodiments with an integration of components such as, in particular, controllable switches of the multiplexer in an IC, only low additional costs for the integrated circuit IC may arise, and possibly no additional printed circuit board space is required (wherein a detuner would be required even with conventionally only one (immobilizer) channel).

In embodiments with an integration of a discharge switch (or pair of switches) in series downstream of the multiplexer can allow the discharge of all the antenna resonant circuits by means of only one controllable switch (or only one pair of controllable switches), instead of providing a dedicated switch for each resonant circuit.

Drivable switches of the circuit may simply be in each case individual switches, or alternatively in each case a pair of switch elements, e.g., MOSFETs arranged back-to-back, which can be at high impedance in both current directions in the non-activated or switched-off state.

A capacitance and/or an ohmic resistance of the detuner of the receiving circuit are external components and/or arranged outside an integrated circuit having controllable switches of the receiving circuit, and/or are adjustable in the capacitance thereof and/or the resistance thereof, which can enable flexbility in the installation.

BRIEF DESCRIPTION OF THE DRAWINGS

Further possible features and advantages of embodiments of the present teaching will become apparent from the following description of exemplary embodiments illustrated in the figures, in which.

DETAILED DESCRIPTION

The disclosure relates to reception of a response AW (transmitted by low-frequency magnetic field) of a transponder TRANS (e.g., of a key for a motor vehicle) on a plurality or all of the antenna channels of a PASE system (PASE=Passive Start and Entry), including via antennas at doors or at the trunk etc. of a motor vehicle. Hereinafter, an antenna can be in particular a so-called inductive antenna, which can operated in particular at low frequency (=LF) for generating a magnetic field.

Figure 1:
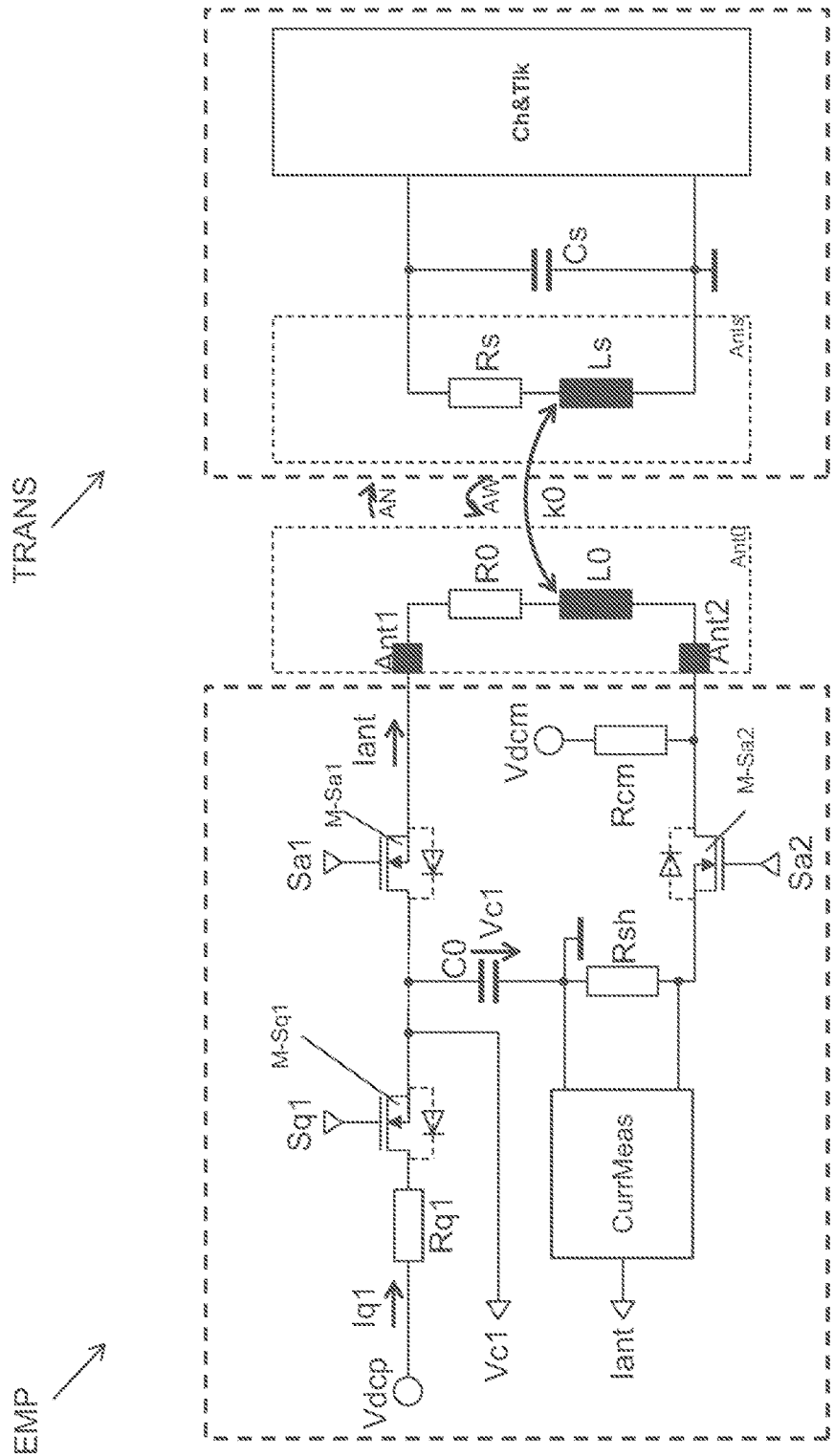
FIG. 1 shows an antenna driver circuit of an antenna of a motor vehicle and a transponder that receives from there and transmits to there by radio.

FIG. 1 shows a (transmitting and) receiving circuit EMP comprising a parallel resonant circuit (here a quasi-resonant resonant circuit driver) (usable for configurations according to the invention with a multiplexer in FIG. 2 or 3) and also the coupling k0 to an immobilizer transponder TRANS (e.g. of a motor vehicle key type), which (e.g., in response to an enquiry AN with a comparatively large carrier signal having modulated data) can itself emit its response signal AW (to EMP), e.g., according to the Charge&Talk principle (reference sign Ch&Tlk). The reference signs L0+R0 together represent an equivalent circuit (for an inductance L0 and an ohmic resistance R0) for an LF antenna Ant0 operated by the here quasi-resonant resonant circuit driver. Said LF antenna Ant0 is magnetically coupled (with the coupling factor k0) to the transponder coil Ants (represented by the equivalent circuit of Ls and Rs) of a (mobile/e.g., useable as automobile key) transponder TRANS.

The transponder coil Ants of the transponder TRANS together with the capacitor Cs of the transponder TRANS forms a damped parallel resonant circuit. If the transponder TRANS replies to an enquiry AN (of the (transmitting and) receiving circuit EMP in a motor vehicle) with a response AW (to the (transmitting and) receiving device EMP), then said transponder generates a carrier signal by means of its stored energy and modulates it in terms of amplitude (ASK—Amplitude Shift Keying) or in terms of phase (BPSK—Binary Phase Shift Keying), e.g., depending on bit pattern and/or response signal to be emitted.

Via the magnetic coupling k0, the magnetic field emitted by the transponder coil Ants of the transponder TRANS with a modulated carrier signal induces a voltage at the LF antenna Ant0 of the (transmitting and) receiving circuit EMP. The switches M-Sa1, M-Sa2 controllable by control signals Sa1, Sa2 from a controller (Ste) are closed in this case, such that L0 together with C0 forms a parallel resonant circuit. The signal induced (by radio k0) is amplified by the sharpness of resonance of the parallel resonant circuit (if the resonant frequency is not too far away from the carrier frequency) and can be tapped off as voltage Vc1 at the capacitor C0. Since this terminal of C0 forms a circuit node with the source terminal of the controllable switch M-sq1, the drain terminal of the controllable switch M-Sa1 and the current measuring circuit CurrMeas (for measuring a current Iant or a voltage Vc1 of an antenna) or voltage measuring circuit for Vc1, said terminal is already available at an IC pin, e.g., on an integrated circuit (IC).

The DC voltage level Vdcm for suppressing common-mode emission can be present here (e.g., via an ohmic resistance Rcm) at the terminal Ant2 of an antenna. The voltage level Vdcm can be Vc1/2 in half-bridge operation illustrated or ground, etc. in full-bridge operation (not illustrated).

Figure 2:
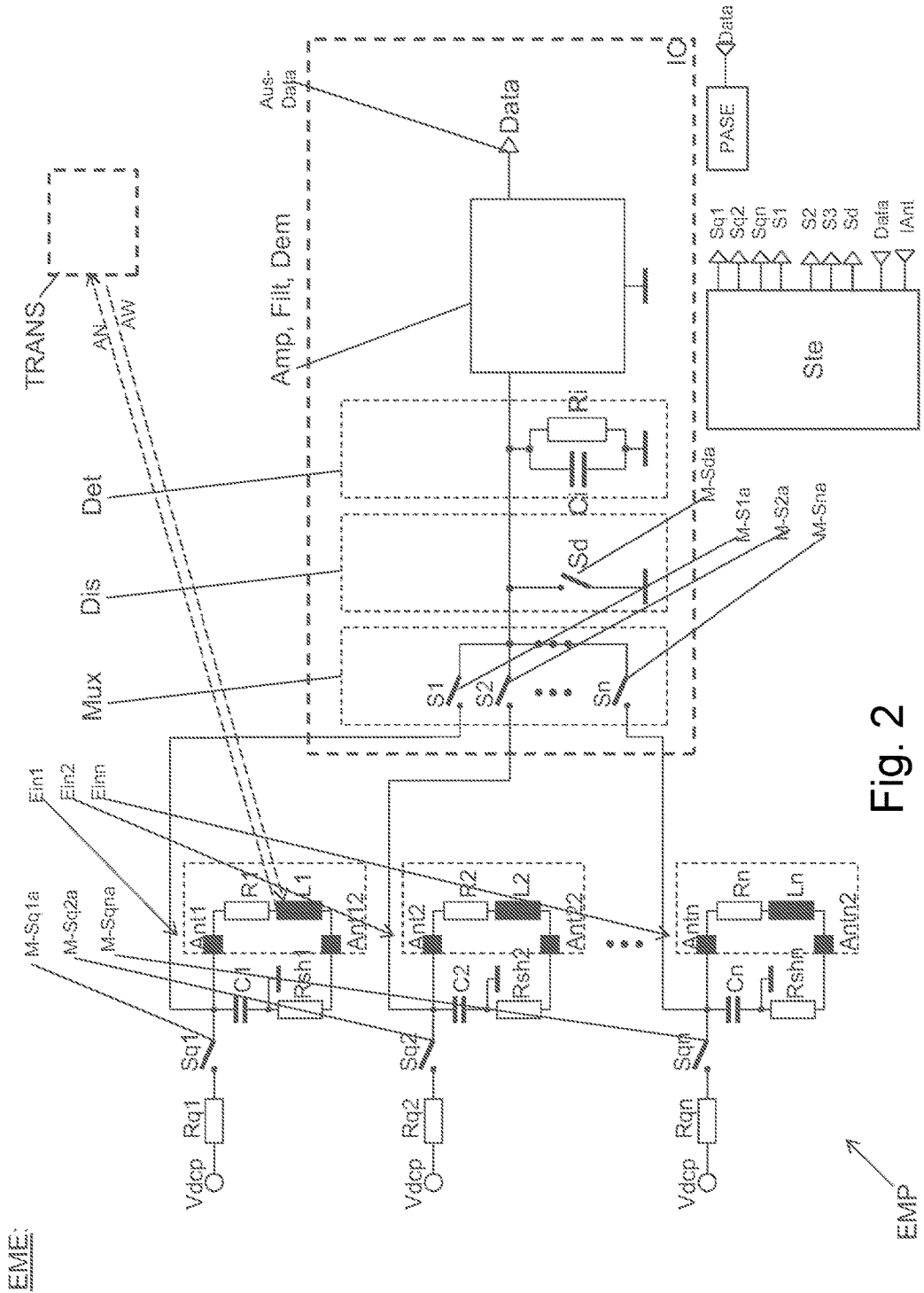
FIG. 2 shows a (transmitting and) receiving circuit according to the invention.

FIG. 2 shows a (transmitting and) receiving arrangement EMP according to the invention comprising n (n>=2, n=natural number) antennas Ant12, Ant22, Antn2 in parallel resonance connection with n antenna drivers (in each case on the left of the antennas in FIG. 2, with capacitances C1, C2, . . . Cn).

In some embodiments, a (transmitting and) receiving arrangement EMP can be a driver circuit and/or be arranged at an electronic control unit (ECU) of a (e.g., CAN) vehicle bus of a motor vehicle, etc.

The terminals of the resonance capacitors C1 to Cn can be switched through to an output, e.g., to the input of an immobilizer controller (e.g., of a motor vehicle), via an N-to-1 multiplexer (N>=2, N=natural number, N=number of multiplexable MUX inputs) with a discharge switch n-Sda drivable by a signal Sda (from a controller Ste) and with a detuner Det.

Figure 3:
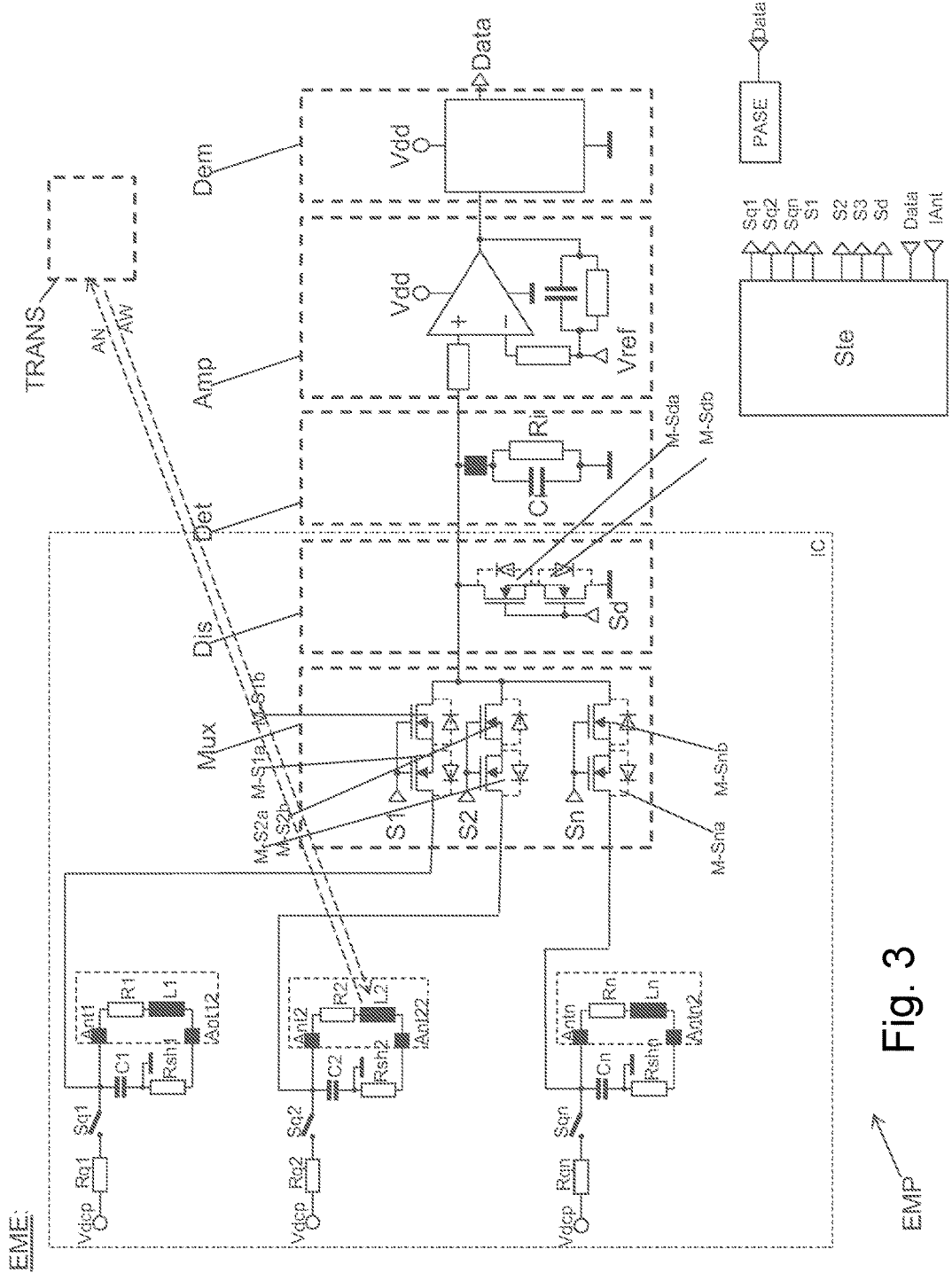
FIG. 3 shows a further (transmitting and) receiving circuit according to the invention.

The multiplexer Mux here comprises the (individual) switches M-S1a, M-S2a, M-Sna drivable by a respective signal S1, S2, Sn from a controller Ste in FIG. 2 or the pairs of switches M-S1a & MS1b and M-S2a & MS2b and M-Sna & M-Snb controllable by a (for a pair) common signal S1, S2, Sn in FIG. 3.

Via the multiplexer Mux, an antenna channel, that is to say one of the antennas Ant1, Ant2, Antn, is selected for the reception of a transponder response AW of a transponder TRANS.

By means of the discharge switch M-Sd in FIG. 2 (or by means of the pair of discharge switchs M-Sda & M-Sdb in FIG. 3), the parallel resonant circuit C1/L1 or C2/L2 or Cn/Ln (selected by means of the multiplexer Mux by one of its switches) is discharged before reception (reception here means before an evaluation with Amp, Filt, Dem, etc., for generating data) of a transponder response AW of the transponder TRANS.

For reception itself, the switch M-Sd in FIG. 2 (or the pair of discharge switches M-Sda & M-Sdb in FIG. 3) is at high impedance and/or open.

The detuner Det is connected in parallel with a resonance capacitor (=a capacitance) Cx (x=1 or 2 or n) by one of the (individual) switches M-S1a, M-S2a, M-Sna drivable by a respective signal S1, S2, Sn from a controller Ste in FIG. 2 or one of the pairs of switches M-S1a & MS1b or M-S2a & MS2b or M-Sna & MSnB controllable by a (for a pair) common signal S1, S2, Sn in FIG. 3 of the multiplexer MUX, that is to say e.g. is connected in parallel with the capacitance C1 by the switch M-S1a of the multiplexer MUX.

In this case, the capacitor C1 reduces the resonant frequency of the switched parallel resonant circuit (Cx, Lx where x=1 or 2 or n) connected to it (by the multiplexer MUX), while the resistance Ri of the detuner Det can reduce in particular the operating quality factor of the parallel resonant circuit.

Reception (e.g., at an antenna with an evaluation with Det, Amp, Filt, Dem for generating data) of the transponder response AW can be possible at different or all antenna channels (that is to say inputs Ein1, Ein2, Einn with a respective antenna Ant12, Ant22m Antn2) e.g., of a motor vehicle, also via antenna channels/inputs Ein1, Ein2, Einn at doors or at the trunk, etc., of a motor vehicle etc.

Drivable switches (M-S1a, M-S2a, M-Sna or M-S1a & MS1b or M-S2a & MS2b or M-Sna & MSnb) provided for operation (e.g., including selection with a multiplexer and/or for discharging Dis) of a parallel resonant circuit can be integrated in an integrated circuit or IC, with the result that no additional IC pins would be required for the implementation of the multiplexer MULT.

For example, apart from the detuner Det and/or antennas, all parts of the immobilizer receiver can be integrated (e.g., in a module and/or integrated circuit and/or IC). Costs and space requirement of the arrangement can thus be optimized. The multiplexer MULT can likewise be useable for other immobilizer receivers. Therefore, different immobilizer receivers can be connected downstream of the multiplexer MULT, with the result that an IC can be made compatible for different types of transponders TRANS.

By virtue of the discharge circuit (discharger Dis), the immobilizer receiver can be rapidly ready for reception (e.g., in significantly less than 1 ms in comparison with conventional arrangements with a plurality of ms).

The detuner Det can pull the resonant frequency and the operating quality factor of (at least) one of the parallel resonant circuits to values which enable the best signal quality factor for the reception of a transponder response Aw of a transponder TRANS.

A (transmitting and) receiving device EMP comprises e.g. controllable switches M-Sq1a, M-Sq2a, M-Sqna in the form e.g. of at least one MOSFET for recharging control, that is to say for controlling the feeding of energy from a voltage source Vdcp with a positive voltage with respect to ground into at least one (or in FIGS. 2-3 at least two or at least three) resonant circuit(s) formed in each case from an antenna Ant 1, Ant12, Ant22, Antn2 and at least one capacitance C1, C2, Cn.

FIG. 3 likewise shows an example embodiment, with the possibility of integrating many or all components of a (transmitting and) receiving circuit EMP (e.g., with the exception of the detuner Det and/or the antennas) in an integrated circuit, e.g., in an IC.

A plurality or all of the drivable switches M-S1a & MS1b, M-S2a & MS2b, M-Sna & MSnb, MSda & M-Sdb of the multiplexer and/or discharger, according to one configuration of the invention, are intended to be at high impedance in the switched-off state, in particular independently of the sign of the voltage across a switch.

For this purpose, in the exemplary embodiment in FIG. 3, back-to-back MOSFETs M-S1a & MS1b, M-S2a & MS2b, M-Sna & MSnb, MSda & M-Sdb are used, which are connected in series and the parasitic bulk-drain diodes of which have opposite reverse directions.

The components Amp, Filt, Dem illustrated in combination for simplification in FIG. 2 are illustrated schematically in FIG. 3 in part individually as amplifier Amp having a supply voltage Vdd and a drive VRef and as demodulator having a supply voltage Vdd.

The components Ci and Ri of the detuner Det are intended to be adapted (in an application) to the component values of the antenna resonant circuits (having antennas Ant12, Ant22, Antn2 and capacitances C1, C2, . . . Cn) of the (transmitting and) receiving arrangement EMP; therefore, it is particularly advantageous to develop exactly one integrated circuit IC and to keep Ci and Ri adjustable as external components.

The invention claimed is:

1. A transmitting and receiving circuit for use with a vehicle and serving for receiving a signal of a transponder, the transmitting and receiving circuit comprising:
an output path including an output antenna emitting an enquiry signal for receipt by a first parallel resonant circuit of the transponder reacting to the enquiry signal by generating a carrier signal using stored energy and then modulating the carrier signal in terms of either amplitude or phase;

a plurality of input paths each having an antenna and a respective parallel resonant circuit;

a multiplexer with a plurality of switches controlled by control signals and connecting a chosen one of the input paths to a detuner; and a discharge switch operable to discharge a second parallel resonant circuit in the chosen one of the plurality input paths among the plurality of input paths before reception of a response to the enquiry signal;

the detuner pulling a resonant frequency and an operating quality factor of the chosen one of the plurality of input paths to values improving signal quality factor for reception of the modulated carrier signal from the second parallel resonant circuit.

2. The receiving circuit as claimed in claim 1, wherein the receiving circuit is arranged in a motor vehicle.

3. The receiving circuit as claimed in claim 1, further comprising at least three input paths each having a respective antenna.

4. The receiving circuit as claimed in claim 1, wherein the input paths of the receiving circuit are installed at one or a plurality of doors of a motor vehicle and/or as an exterior antenna of a motor vehicle.

5. The receiving circuit as claimed claim 1, wherein at least one output for an output signal of the receiving circuit is connected to an engine controller and/or immobilizer controller of a motor vehicle and/or to a vehicle access and/or start system (PASE) of a motor vehicle and/or to a motor vehicle side system for becoming acquainted with a transponder.

6. The receiving circuit as claimed in claim 1, wherein the input paths receive a signal, with regard to a respective inductance value of the antenna and a capacitance value of an associated capacitance connected in parallel therewith for forming a resonant circuit, for defining a frequency of the resonant circuit corresponding to the transmission frequency of a transponder (TRANS).

7. The receiving circuit as claimed in claim 1, further comprising:

in a manner driven by a controller and at least one controllable switch, at least one capacitance connected in parallel with a respective antenna connectable via the multiplexer to a discharger controlled by a control signal to discharge a resonant circuit formed by said capacitance and the antenna before said resonant circuit is connected to the detuner and/or amplifier and/or demodulator.

8. The receiving circuit as claimed in claim 1, wherein, if the detuner is connectable to at least one selected input path by a switch controlled by a control signal, a capacitance of the detuner is connectable in parallel with the capacitance of the connected input path, for reducing the resonant frequency of the connected input path.

9. The receiving circuit as claimed in claim 1, wherein, if the detuner is connected to one of the input paths by a switch controlled by a control signal, an ohmic resistance of the detuner is connected to the connected input path, for reducing the operating quality factor of the connected input path.

10. The receiving circuit as claimed in claim 1, wherein at least one of the switches is arranged in the multiplexer and/or in a discharger and/or the input paths of the receiving circuit in the same module and/or in the same integrated circuit.

11. The receiving circuit as claimed in claim 1, wherein the switches in the multiplexer and/or in a discharger and/or in the input paths of the receiving circuit comprise pairs of MOSFETs arranged back to back with respect to one another, receiving the same control signal, in order to put switches at high impedance in the switched off state.

12. The receiving circuit as claimed in claim 1, wherein at least some switches in the multiplexer and/or in a discharger and/or in the input paths of the receiving circuit are individual switches.

13. The receiving circuit as claimed in claim 1, wherein a capacitance and/or an ohmic resistance of the detuner of the receiving circuit are external components and/or arranged outside an integrated circuit having controllable switches of the receiving circuit, and/or are adjustable in the capacitance thereof and/or the resistance thereof.

14. A transmitting and receiving device for a keyless vehicle access and/or start system (PASE), the device comprising:

an output path including an output antenna emitting an enquiry signal for receipt by a first parallel resonant circuit of a transponder reacting to the enquiry signal by generating a carrier signal using stored energy and then modulating the carrier signal in terms of either amplitude or phase;

a plurality of input paths each having an antenna and a respective parallel resonant circuit;

a multiplexer with a plurality of switches controlled by control signals and connecting at least one of the input paths to a detuner;

a plurality of antennas for receiving a radio signal of a transponder, a controller for generating control signals for driving controllable switches of the receiving circuit; and a discharge switch operable to discharge a second parallel resonant circuit in the chosen one of the plurality input paths among the plurality of input paths before reception of a response to the enquiry signal;

the detuner pulling a resonant frequency and an operating quality factor of one of the plurality of input paths to values improving signal quality factor for reception of the modulated carrier signal from the second parallel resonant circuit.

15. The receiving circuit as claimed in claim 1, wherein at least one output of the receiving circuit is connected to an engine controller and/or immobilizer of a motor vehicle and/or to a vehicle access and/or start system of a motor vehicle for releasing an immobilizer and/or opening a vehicle door and/or training a controller of a motor vehicle to a key.

* * * * *